(12) United States Patent
Ko

(10) Patent No.: US 6,240,151 B1
(45) Date of Patent: May 29, 2001

(54) METHOD FOR TRANSMITTING AND RECEIVING ASYNCHRONOUS SERIAL DATA IN DIGITAL SIGNAL PROCESSOR

(75) Inventor: Jin-Sin Ko, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/056,763

(22) Filed: Apr. 8, 1998

(30) Foreign Application Priority Data

Apr. 8, 1997 (KR) .................................................. 97/12794

(51) Int. Cl.[7] .................................................. H04L 25/38
(52) U.S. Cl. .................................................. 375/370
(58) Field of Search .................................. 375/370, 369; 370/305, 304

(56) References Cited

U.S. PATENT DOCUMENTS

| | | |
|---|---|---|
| 5,155,486 | 10/1992 | Murfet et al. . |
| 5,623,522 * | 4/1997 | Ito ........................................ 375/369 |

FOREIGN PATENT DOCUMENTS

| | | |
|---|---|---|
| 62-20451 | 1/1987 | (JP) . |
| 62-81840 | 4/1987 | (JP) . |
| 63-238745 | 10/1988 | (JP) . |
| 3-85043 | 4/1991 | (JP) . |

OTHER PUBLICATIONS

Texas Instruments, TMS320C30 Digital Signal Processor, Apr. 1996, Revised Jun. 1997, pp. 1–53.

\* cited by examiner

*Primary Examiner*—Chi Pham
*Assistant Examiner*—Kevin M Burd
(74) *Attorney, Agent, or Firm*—Robert E. Bushnell, Esq.

(57) ABSTRACT

Methods of transmitting and receiving asynchronous serial data using a serial port of a digital signal processor are provided. The method of asynchronously receiving serial data via a serial port a TMS320C30 DSP including: a reception timer period register for storing pulse section information representing how many clock pulses correspond to one bit of data; and a reception timer counter for counting the clock pulses up to a value determined by the reception timer period register, resetting the counted value to zero, and counting again starting from zero, includes the steps of determining whether a start bit is received, enabling the serial port when the received start bit falls from high to low, setting the initial value of the reception timer counter to half the value in the reception pulse section register, receiving one bit of data whenever the value of the reception timer counter becomes equal to the value in the reception timer period register, the reception is repeated until a stop bit is received, and disabling the serial port when the stop bit is received. According to this method, data is asynchronously transmitted and received via a synchronous serial port of a TMS320C30 DSP. Therefore, a fault does not occur even during a long communication, and very reliable asynchronous serial communication is possible.

10 Claims, 4 Drawing Sheets

| BIT | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| NAME | RECEPTION TIMER PERIOD REGISTER ||||||||||||||||

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | TRANSMISSION TIMER PERIOD REGISTER ||||||||||||||||

| BIT | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| NAME | RECEPTION TIMER COUNTER REGISTER ||||||||||||||||

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | TRANSMISSION TIMER COUNTER REGISTER ||||||||||||||||

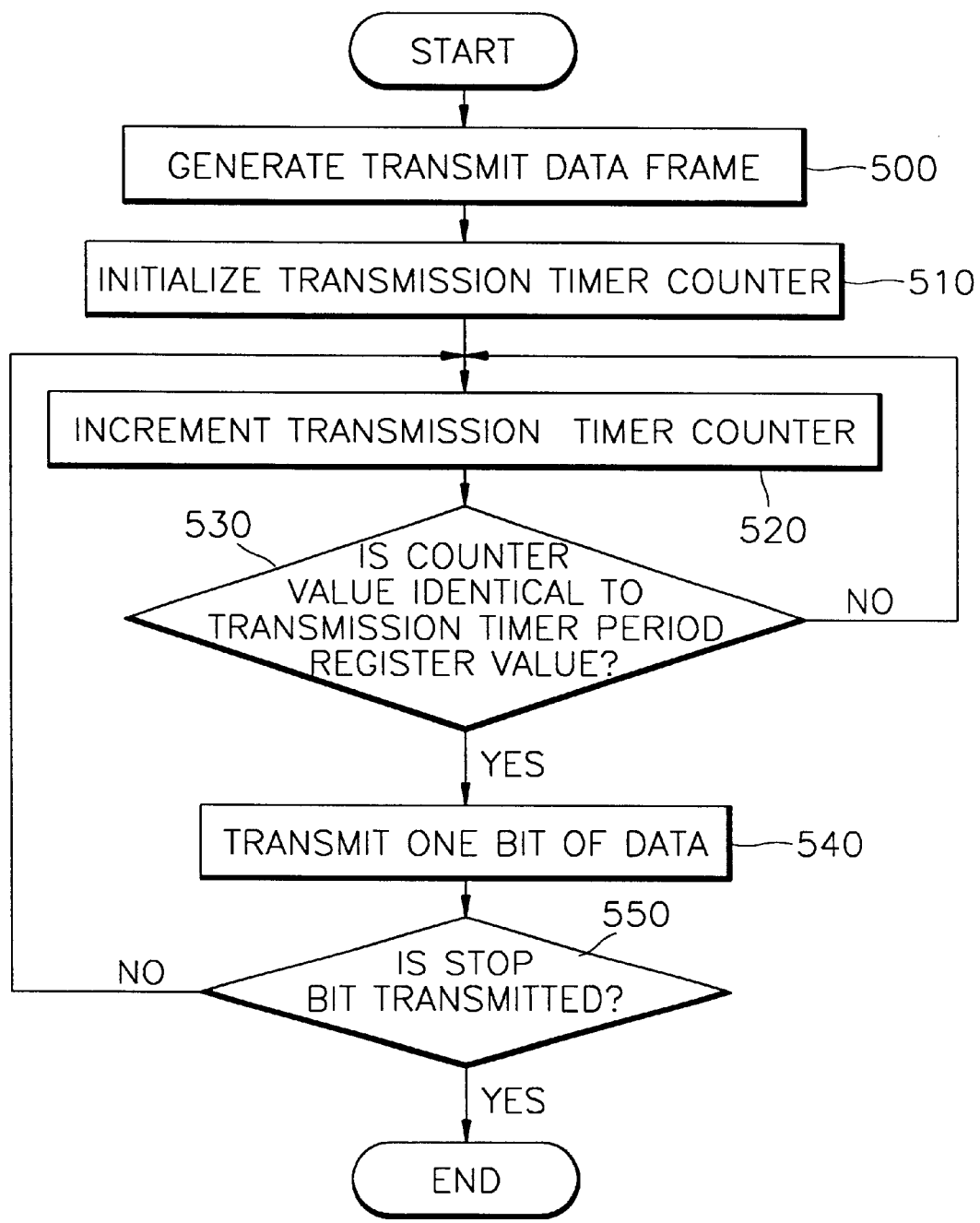

METHOD FOR TRANSMITTING AND RECEIVING ASYNCHRONOUS SERIAL
DATA IN DIGITAL SIGNAL PROCESSOR

CLAIM OF PRIORITY

This application makes reference to, incorporates the same herein, and claims all benefits accruing under 35 U.S.C §119 from an application entitled Method For Transmitting And Receiving Asynchronous Serial Data In Digital Signal Processor earlier filed in the Korean Industrial Property Office on Apr. 8, 1997, and there duly assigned Serial No. 97-12794 by that Office.

BACKGROUND OF THE INVENTION

1. Field of the Invention

The present invention relates to a serial data communicating method, and more particularly, to a method for asynchronously transmitting and receiving data using a serial port of a digital signal processor (DSP).

2. Background Art

A 32-bit floating point processor such as the TMS320C30 digital signal processor (DSP) by Texas Instruments (TI®) is a dedicated digital processor which has been widely used in a servo controller and for image processing. A general digital signal processor has a serial port or a parallel port to transmit and receive data to and from another processor. The TMS320C30 DSP has a synchronous serial communication port, and performs asynchronous serial communication with another TMS320C30 DSP at high speed through the serial communication port.

In general, it would be convenient if the DSP serial port could be connected to a general-purpose system such as a personal computer (PC) or a notebook computer. For instance, a program coded on a PC can be downloaded to the DSP, or data of the DSP can be continuously logged by a PC during the operation of the DSP system. If the output values of a controller of a servo system using DSP are logged and then analyzed by a PC, an optimal controller could be easily realized. Also, a notebook computer could issue an operation command to a DSP system so that the DSP system could perform a specific operation, whereby a simple emulation may be performed. That is, an external system could be tested irrespective of the working place and equipment, if the DSP serial port could be connected to a general-purpose system.

Currently, however, the DSP can not perform data communication with a general purpose computer system such as a PC or a notebook PC in a serial communication method using a serial port of the DSP. Therefore, a special asynchronous communication method is required to realize serial communication with the general-purpose computer system. Asynchronous data reception is discussed in U.S. Pat. No. 5,155,486 to Philip J. Murfet et al. entitled Asynchronous Serial Data Receiver With Capability For Sampling The Mid-Point Of Data Bits and U.S. Pat. No. 5,623,522 to Masahiro Ito entitled Asynchronous Serial Data Receiving Device. The asynchronous communication, however, needs some hardware and software, because of the fact that asynchronous data begins with a start bit which is not part of the actual data. That is, the start of reception of data is recognized using the start bit, and the following bits are read according to the value of a reception timer counter register. Also, upon transmission of data, the bits are transmitted one by one using a transmission timer counter register.

Through a communication experiment, I have found that the transmission and reception timer counters in the TMS320C30 DSP perform a continuous counting operation in synchronization with a clock pulse of a processor, regardless of whether serial communication is performed or not. Accordingly, the values of the transmission and reception timer counters s are not consistent at the point of time when the start bit is transmitted or received, which causes a communicational failure during lengthy communications.

SUMMARY OF THE INVENTION

It is an object of the present invention to provide a method for transmitting and receiving data using a serial port of a DSP, whereby a communication error can be prevented by resetting the value of a reception timer counter to a predetermined value whenever a start bit is received when receiving asynchronous data transmitted via a serial port, in order to have data read at the middle point of a pulse section for each bit of a data signal, and a pulse section per bit of a transmission signal is adjusted and transmitted by resetting a transmission timer counter to zero at the beginning point of transmission of the start bit during data transmission.

To accomplish the above object, there is provided a method of asynchronously receiving serial data via a serial port of a TMS320C30 DSP including: a reception timer period register for storing pulse section information representing how many clock pulses correspond to one bit of the serial data, when a 1-bit time section of the transmitted serial data is expressed as a pulse section composed of a plurality of clock pulses; and a reception timer counter for counting the clock pulses up to a value determined by the reception timer period register, resetting the counted value to zero, and counting again starting from zero, the method comprising the steps of: determining whether a start bit is received; enabling the serial port when the received start bit falls from high to low; setting the initial value of the reception timer counter to half the value in the reception pulse section register, when the serial port is enabled; receiving one bit of data whenever the value of the reception timer counter becomes equal to the value in the reception timer period register, until a stop bit is received; and disabling the serial port when the stop bit is received.

Additionally, there is provided a method of asynchronously transmitting serial data via a serial port in a TMS320C30 DSP including: a transmission timer period register for storing pulse section information representing how many clock pulses correspond to one bit of the serial data, when a 1-bit time section of the transmitted serial data is expressed as a pulse section composed of a plurality of clock pulses; and a transmission timer counter for counting the clock pulses up to a value determined by the transmission timer period register, resetting the counted value to zero, and counting again starting from zero, the method comprising the steps of: generating transmission data by adding start and stop bits to the beginning and end of a portion of the data to be transmitted, to make asynchronous data; initializing the transmission timer counter to zero at the point in time when the start bit is transmitted; transmitting one bit of data, whenever the value of the transmission timer counter becomes equal to the value in the transmission timer-period register; and repeating the step of transmitting one bit until the stop bit is transmitted.

BRIEF DESCRIPTION OF THE DRAWINGS

The above object and advantages of the present invention will become more apparent by describing in detail a preferred embodiment thereof with reference to the attached drawings in which:

FIG. 5 is a flowchart outlining the procedure for serial data transmission.

DETAILED DESCRIPTION OF THE INVENTION

RS232C serial data is composed of one start bit, eight bits of data and one stop bit. An additional bit may be added for detecting communicational errors, for example, a parity bit. Usually the RS232C serial data simply consists of a total of 10 bits. A general serial communication controller receives data by recognizing the start and stop bits. A DSP serial communication port, however, is designed to simply receive data depending on the value of a reception counter as soon as a data bit enters.

Here, the start bit is not information that a user needs but a bit indicating the start of data reception. In an asynchronous transfer, data reception is only possible if the beginning of the data is recognized using the start bit. The start bit is at the beginning of a data bitstream, so it is not difficult to find the start bit.

Figures 1A, 1B, 2:
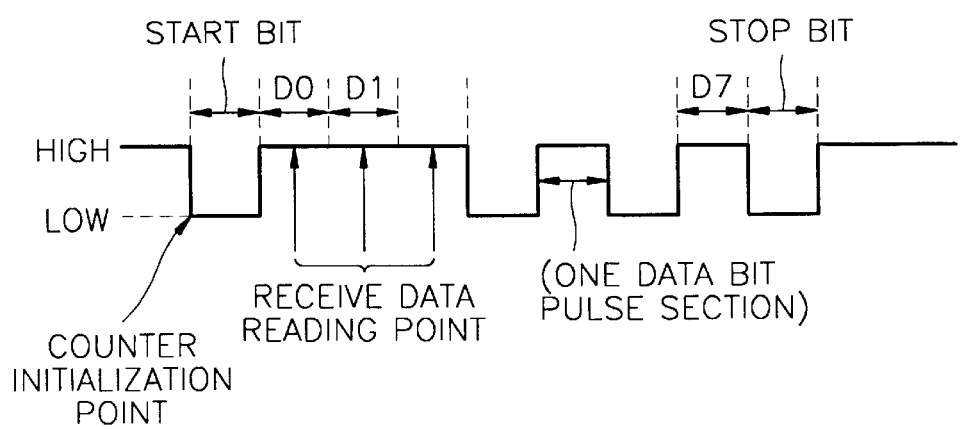
FIGS. 1A and 1B show registers used for asynchronous data transmission and data reception using a serial communication port of a TMS320C30 DSP.
FIG. 2 shows the concept that data can be stably received at the middle portion of a pulse, by resetting a reception timer counter to a predetermined value when serial data is received, according to the present invention.

FIGS. 1A and 1B show registers used for asynchronous data transmission and reception using a serial communication port of a TMS320C30 DSP. FIG. 1A shows a reception and transmission timer period register which stores pulse section information representing how many clock pulses correspond to one bit of data, when a 1-bit section of data transmitted during serial transmission is represented by a pulse section composed of a plurality of clock pulses. The reception and transmission timer period register is of 32-bit size to define a 1-bit pulse section of the serial transmission. The lower 16 bits, i.e., bit 0 to bit 15, represent a transmission 1-bit pulse section, and the upper 16 bits, ie., bit 16 to bit 31, represent a reception 1-bit pulse section.

FIG. 1B shows a reception and transmission timer counter register representing the output of a reception and transmission timer counters (not shown). The reception and transmission timer counter counts clock pulses until it reaches the value set in the reception and transmission timer period register, resets the counted value back to zero, and again stores the output value of the reception and transmission timer counter which repeats the count operation in the register. The reception and transmission timer counter register is a 32-bit register whose lower 16 bits, i.e., bit 0 to bit 15, are for a transmit timer counter (not shown) and upper 16 bits, i.e., bit 16 to bit 31, are for a reception timer counter (not shown).

First, a method for receiving asynchronous serial data using the registers will now be described. Referring to FIG. 2, serial data is composed of one start bit, eight bits of data D0–D7 and one stop bit. Data is stably received and read at the middle portion of a pulse by setting the initial value of a receive timer counter during serial data reception. The value of the reception timer counter is set to half the value of the reception timer period register, at the point in time when a start bit falls from high to low, in order to read the middle point of the pulse section representing each bit when determining the bit value thereof.

Figure 3:
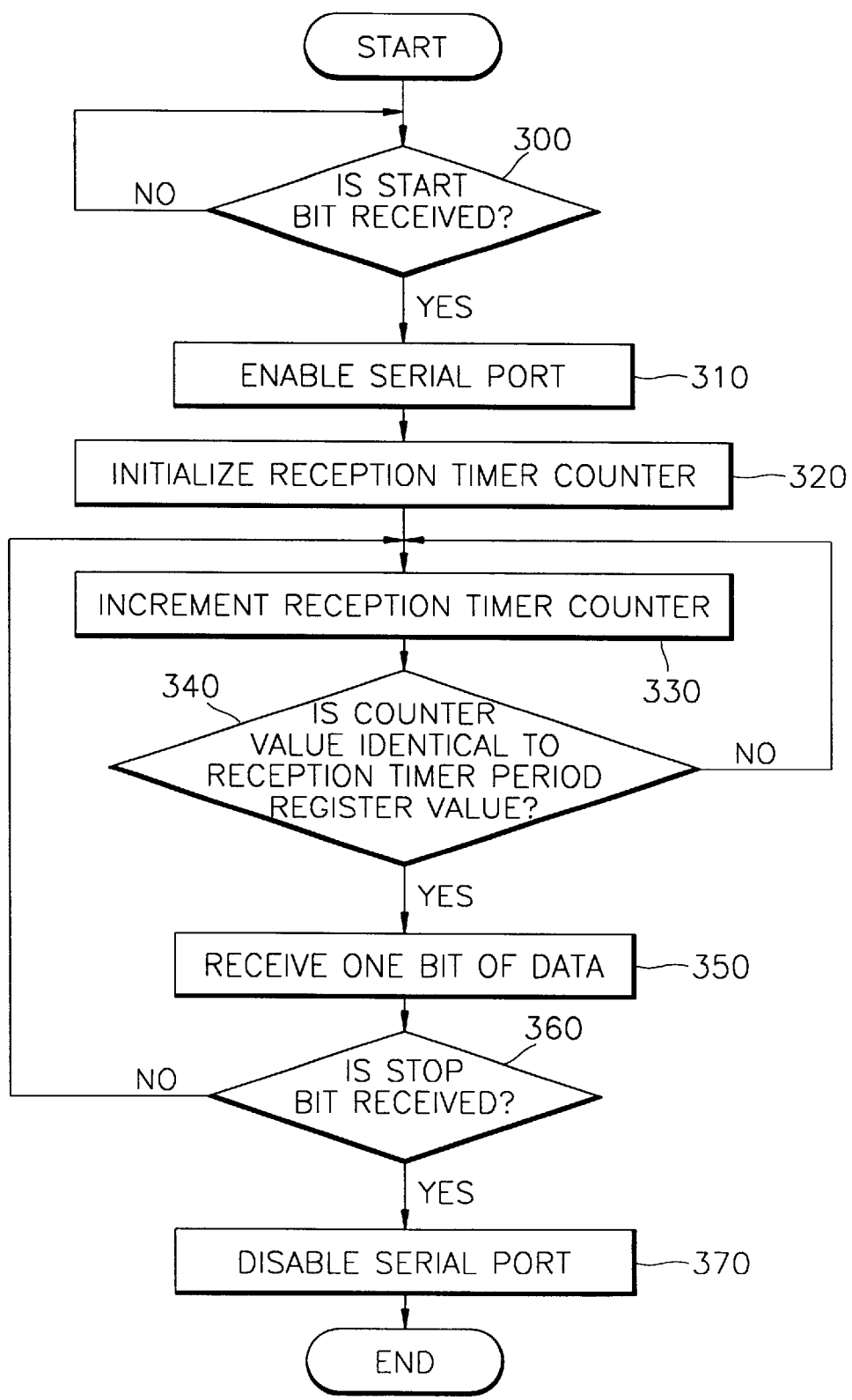
FIG. 3 is a flowchart outlining the procedure for asynchronous data reception.

Referring to FIG. 3, a DSP receives asynchronous serial data via a serial port installed in the DSP. A general DSP recognizes whether data is received or not through a receive register. Accordingly, after receiving data, the DSP detects whether a start bit is received or not, in order to know whether the data is asynchronous or not, in step 300. The presence or absence of a start bit is detected when serial data falls from high to low. When it is detected that the start bit is received, the serial port is enabled, in step 310. That is, when the data stream signal is connected to an interrupt signal line of the DSP, an interrupt occurs when the start bit is detected. Then, the DSP is informed that serial data is to be received and enables the serial port.

Next, after the serial port is enabled, the reception timer counter is initialized, in step 320. This is because a counter of the TMS320C30 DSP is incremented continuously by a clock of the DSP, regardless of whether serial communication is performed or not. Also, another reason is to enable the bit values to be read at the middle point of the pulse section representing each data bit D0–D7. The initialization is accomplished as follows. First, the value of the reception and transmission timer period register is read and stored in a temporary variable register called SETT. Then, the SETT is shifted 16 bits to the right, because the pulse section value per bit of received data corresponds to the upper 16 bits of the reception and transmission timer period register. Thereafter, the SETT is divided by two, shifted by 16 bits to the left, and stored in a register (not shown) representing the output value of the reception timer counter. The reason for performing the above steps is that if the reception timer counter value is set to half a pulse section per received data bit at the point of time when a start bit begins to be received, the counting operation begins with the value so that the middle point of the pulse section representing one bit can be accurately read. In the mean time, after the initialization of the reception timer counter is completed in step 320, the counter keeps counting in synchronization with a clock pulse of the DSP, in step 330. Then, it is determined whether the incremented value of the counter is equal to the value of a 1-bit pulse section defined in the reception timer period register, in step 340. When it is detected that the increased counter value is the same as the 1-bit pulse section value, this time corresponds to the time of half the pulse section representing one bit, so that one bit of data is received, in step 350. Again, the reception timer counter is reset to zero, and it is determined whether a stop bit was received, in step 360. The steps 330, 340, 350 and 360 are repeated until the stop bit is received. When all eight bits of data DO-D7 have been received via a synchronous serial port of the TMS320C30 DSP and the stop bit is received, the serial port is disabled by generating a receive interrupt of the DSP, in step 370. In this way, asynchronous serial data reception is completed.

Now, a method of asynchronously transmitting serial data using the registers will be described. In order to transmit data in real time, the DSP installs a transmit queue to store data to be transmitted, and monitors the transmit queue using a real-time timer interrupt. If it is detected that the transmit queue is not empty, the transmit interrupt is enabled to extract and transmit the data in the transmit queue. If the transmit queue is empty, the transmit interrupt is disabled, to thereby perform an interrupt handshake.

Since the real-time processing system makes an interrupt-controlled transmission, a queue must be managed well to transmit data to the other party in real time. The basic operation of the queue is to write data to a head address part and read the data from a tail address part. When data is transmitted to the queue using the real time interrupt, a transmit interrupt transmits all the data in the queue and then newly designates current tail data by adjusting the tail address by the amount of data transmitted.

However, as a system increases the rate of putting data in the queue during operation, a phenomenon may occur where the head address goes over the tail address. In this circumstance, data management is incorrectly performed due to the breakdown of the queue, thus transmitting the wrong data. The queue can not simply be enlarged to prevent this problem. To solve this problem, a predetermined-sized queue is divided into two stages. The first stage queue stores data to be transmitted by the system. If data is found in the first stage queue, the data is put into the second stage queue. At this time, a tail pointer of the first queue is renewed. Thus, the queue is prevented from overflowing during a long transmit time. When the first stage queue becomes full (a "standby" state), the extraction of data stored in the queue is performed by reading a memory so that the queue is emptied. Thus, standby time is reduced.

Also, when the DSP transmits data using an interrupt-controlled serial communication controller, a lot of interrupts are generated. When the interrupts are generated, a large burden is applied to the DSP to serve the interrupts. Also, in the process of enabling and disabling the interrupts, the operation of the DSP becomes complicated. Thus, an operation failure may occur. In order to solve the above problem, the DSP installs a one-channel DMA (direct memory access) coprocessor for concurrent I/O (input/output) and CPU (central processing unit) operation therein. The DMA is capable of being engaged with the serial port. When a transmit buffer of the memory is allocated, the DMA automatically writes a piece of data to the serial port. When the serial port completes transmitting the data, the DMA automatically writes other data, to reduce the burden on the DSP.

Figure 4:
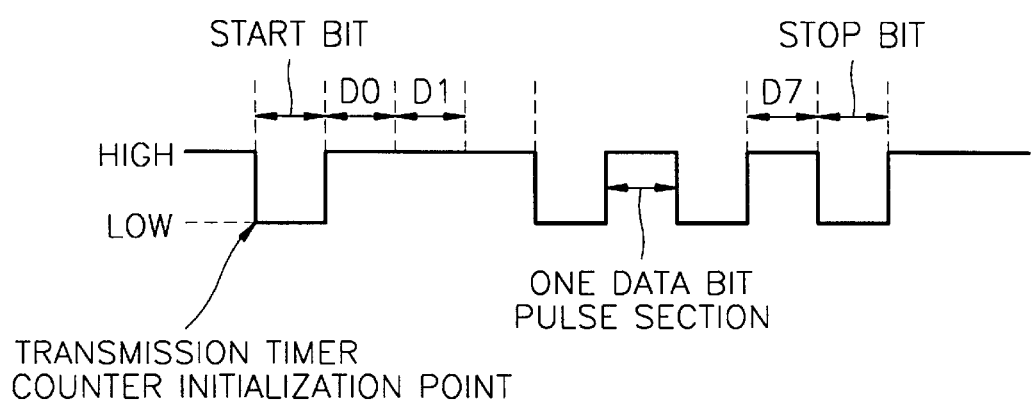
FIG. 4 shows the point of time when a transmission timer counter is reset during asynchronous data transmission according to the present invention.

FIG. 4 shows the point in time when a transmission timer counter is cleared to standardize the transmitted pulse section of one bit to a value defined by the transmission timer period register when data is asynchronously transmitted according to the present invention.

FIG. 5 is a flowchart outlining the process where the DSP asynchronously transmits serial data via the serial port. First, as shown in FIG. 4, for the asynchronous communication, start and stop bits are added to the beginning and end of eight bits of data D0–D7 stored in the queue buffer, thereby generating a transmit data frame, in step 500. Then, a transmission timer counter (not shown) is initialized, in step 510. That is, the value of the transmission timer counter is reset to zero at the time of transmitting the start bit. After the transmission timer counter is initialized, the counter keeps counting in synchronization with a clock pulse of the DSP, in step 520. Next, it is determined whether the incremented value of the counter is equal to the value of a 1-bit pulse section defined in the transmission timer-period register, in step 530. When the two values are the same, one bit of data is transmitted, in step 540. Then, the transmission timer counter is again reset to zero, and it is determined whether the stop bit was transmitted, in step 550. Steps 520, 530, 540 and 550 are repeated until the stop bit is transmitted. Then, the asynchronous serial data transmission via the synchronous serial port of the TMS320C30 DSP is completed.

Meanwhile, the asynchronous serial data transmitting and receiving method adds a simple hardware, so it is applicable to both of RS232C and RS422 methods corresponding to an international standard of asynchronous communications.

According to the present invention as described above, asynchronous data transmission and reception can be accomplished via the synchronous serial port of the TMS320C30 DSP. Also, no fault occurs even during long communications. A very reliable asynchronous serial communication is possible.

What is claimed is:

1. A method of asynchronously receiving serial data via a serial port of a digital signal processor including: a reception timer period register for storing pulse section information representing how many clock pulses correspond to one bit of the serial data, when a 1-bit time section of transmitted serial data is expressed as a pulse section composed of a plurality of clock pulses; and a reception timer counter for counting generated clock pulses up to a value determined by said reception timer period register, resetting the reception timer counter to a counted value of zero, and counting again starting from zero, said method comprising the steps of:

determining whether a start bit is received;

enabling, when it is determined that said start bit has been received, said serial port when said start bit falls from a high logic value to a low logic value;

setting an initial value of said reception timer counter to half the value in said reception timer period register, when said serial port is enabled;

incrementing the value of said reception timer counter in response to said clock pulses;

receiving one bit of data whenever the value of said reception timer counter becomes equal to the value in said reception timer period register;

resetting said reception timer counter to zero, after the step of receiving one bit of data whenever the value of said reception timer counter becomes equal to a value in said reception timer period register;

determining whether a stop bit is received;

returning to said step of incrementing said value of said reception timer counter when it is determined that said stop bit has not been received; and disabling said serial port when said stop bit is received.

2. The method as set forth in claim 1, wherein said serial port is enabled by generating an interrupt when said start bit falls from said high logic value to said low logic value, and said serial port is disabled by generating a receive interrupt when said stop bit is received.

3. The method as set forth in claim 1, wherein said digital signal processor is a TMS320C30 digital signal processor.

4. A method of asynchronously transmitting serial data via a serial port in a digital signal processor including: a transmission timer period register for storing pulse section information representing how many clock pulses correspond to one bit of the serial data, when a 1-bit time section of the serial data is expressed as a pulse section composed of a plurality of clock pulses; and a transmission timer counter for counting said clock pulses up to a value determined by said transmission timer period register, resetting the transmission timer counter to a value of zero, and counting again starting from zero, said method comprising the steps of:

generating a data frame by adding start and stop bits to the beginning and end of a portion of the serial data to be transmitted, to make asynchronous data;

initializing said transmission timer counter to zero at the point in time when said start bit is transmitted;

incrementing said transmission timer counter in response to said clock pulses;

transmitting one bit of data, whenever the value of said transmission timer counter becomes equal to a value in said transmission timer period register;

determining whether a stop bit has been transmitted; resetting said transmission timer counter to zero and returning to said step of incrementing said transmission timer counter, until it is determined that said stop bit has been transmitted.

5. The method as set forth in claim 4, wherein said digital signal processor further comprises a transmit queue for temporarily storing data to be transmitted and said step of generating a data frame is performed by adding said start and stop bits to the beginning and end of data stored in said transmit queue, said method further comprises the steps of:

determining whether said transmit queue is empty of data; and enabling a transmit interrupt, to transmit data to said transmit queue, when said transmit queue is not empty of data, and disabling said transmit interrupt, to stop data transmission, when said transmit queue is empty of data.

6. The method as set forth in claim 5, wherein said transmit queue comprises:

a first transmit queue for storing said data to be transmitted by said digital signal processor; and a second transmit queue for storing data of said first transmit queue and supplying data to said data frame generating step.

7. The method as set forth in claim 5, wherein said digital signal processor is a TMS320C30 digital signal processor.

8. A method of asynchronously receiving or transmitting serial data via a serial port of a TMS320C30 digital signal processor comprising: a first 32-bit register divided in a reception timer period register and a transmission timer period register, each of said reception timer period register and said transmission timer period register storing a value indicating how many clock pulses correspond to one bit of the serial data; a reception timer counter for counting clock pulses generated by said digital signal processor; a transmission timer counter for count said clock pulses generated by said digital signal processor; a second 32-bit register divided into a reception timer counter register and a transmission timer counter register, said reception timer counter storing a value of said reception timer counter and said transmission timer counter storing a value of said transmission timer counter, said method comprising the steps of:

receiving said serial data;

determining whether said serial data includes a start bit;

enabling, when it is determined that said serial data includes said start bit, said serial port when said start bit falls from a high logic value to a low logic value;

setting an initial value of said reception timer counter to half the value in said reception timer period register, when said serial port is enabled;

incrementing said reception timer counter in response to said clock pulses;

receiving one bit of data whenever the value of said reception timer counter register becomes equal to the value in said reception timer period register;

resetting said reception timer counter to zero, after the step of receiving said one bit of data whenever the value of said reception timer counter register becomes equal to the value in said reception timer period register;

determining whether a stop bit is received;

returning to said step of incrementing said reception timer counter when it is determined that said stop bit has not been received; and disabling said serial port when said stop bit is received.

9. The method as set forth in claim 8, further comprising the steps of:

storing serial data in a transmit queue for transmission;

adding start and stop bits to the beginning and end said serial data stored in said transmit queue;

transmitting said start bit when said transmit queue is full;

initializing said transmission timer counter to zero at a point in time when said start bit is transmitted;

incrementing said transmission timer counter in response to said clock pulses;

transmitting one bit of data, whenever the value of said transmission timer counter register becomes equal to the value in said transmission timer period register;

determining whether a stop bit has been transmitted;

resetting said transmission timer counter to zero and returning to said step of incrementing said transmission timer counter, until it is determined that said stop bit has been transmitted.

10. The method as set forth in claim 8, further comprising the steps of:

storing serial data in a transmit queue for transmission;

adding start and stop bits to the beginning and end said serial data stored in said transmit queue; transmitting said start bit when said transmit queue is full;

initializing said transmission timer counter to zero at a point in time when said start bit is transmitted;

incrementing said transmission timer counter in response to said clock pulses;

transmitting one bit of data, whenever the value of said transmission timer counter register becomes equal to the value in said transmission timer period register;

resetting said transmission timer counter to zero after said step of transmitting one bit of data;

determining whether a stop bit has been transmitted; and returning to said step of incrementing said transmission timer counter, until it is determined that said stop bit has been transmitted.

* * * * *